(12) United States Patent
Lee et al.

(10) Patent No.: US 6,496,357 B2
(45) Date of Patent: Dec. 17, 2002

(54) METAL OXIDE ELECTROCHEMICAL PSEDOCAPACITOR EMPLOYING ORGANIC ELECTROLYTE

(75) Inventors: Hee-Young Lee, Seoul (KR); Heui-Soo Kim, Seoul (KR); Sun-Wook Kim, Seoul (KR)

(73) Assignee: Ness Capacitor Co., Ltd., Suwon-si (KR)

(*) Notice: Subject to any disclaimer, the term of this patent is extended or adjusted under 35 U.S.C. 154(b) by 0 days.

(21) Appl. No.: 09/824,699

(22) Filed: Apr. 4, 2001

(65) Prior Publication Data

US 2002/0093784 A1 Jul. 18, 2002

(30) Foreign Application Priority Data

Nov. 28, 2000 (KR) .............................................. 00-71136

(51) Int. Cl.$^7$ ................................................. H01G 9/00
(52) U.S. Cl. ...................... 361/503; 361/508; 361/502; 361/523; 361/528; 29/25.03
(58) Field of Search ................................. 361/503, 502, 361/508, 509, 511, 513, 516, 529, 523, 512, 528, 525; 29/25.03

(56) References Cited

U.S. PATENT DOCUMENTS

| 4,864,472 | A | * | 5/1989 | Yoshimura et al. | 361/525 |
| 5,597,663 | A | * | 1/1997 | Pendalwar et al. | 429/198 |
| 5,754,394 | A | * | 5/1998 | Evans et al. | 361/516 |
| 5,827,602 | A | * | 10/1998 | Koch et al. | 429/194 |
| 6,195,251 | B1 | * | 2/2001 | Suhara et al. | 361/502 |
| 6,201,685 | B1 | * | 3/2001 | Jerabek et al. | 361/502 |
| 6,212,062 | B1 | * | 4/2001 | Day et al. | 361/502 |

* cited by examiner

*Primary Examiner*—Dean A. Reichard
*Assistant Examiner*—Nguyen T Ha
(74) *Attorney, Agent, or Firm*—Jacobson Holman PLLC (57) ABSTRACT

A novel electric energy storage system having an increased storage energy. This system includes a plurality of electrodes, an organic electrolyte including a solvent and a solute and a separator inserted between the electrodes for preventing a contact between the electrodes. According to the present invention, an organic electrolyte is used to increase the storage amount of the energy and to improve an electric conductivity. A capacitor having various designs can be manufactured.

13 Claims, 8 Drawing Sheets

METAL OXIDE ELECTROCHEMICAL PSEDOCAPACITOR EMPLOYING ORGANIC ELECTROLYTE

BACKGROUND OF THE INVENTION

1. Field of the Invention

The present invention relates to a metal oxide electrochemical psedocapacitor employing metal oxide as an electrode, and more particularly, to a metal oxide electrochemical psedocapacitor employing an organic electrolyte.

2. Description of the Related Art

Much attention is paid onto a metal oxide electrochemical psedocapacitor as a new energy storage system, because this system retains a large energy storage capacitance when is compared with the conventional electrolytic capacitors. Metal oxides such as nickel oxide (NiO), ruthenium oxide ($RuO_2$), cobalt oxide ($Co_3O_4$), manganese dioxide ($MnO_2$), etc. and electrolytes such as aqueous hydrosulfuric acid, aqueous kalium hydroxide, etc. are utilized for the conventional metal oxide electrochemical psedocapacitor.

The metal oxide electrochemical psedocapacitor possesses many common technical parts included in a lithium secondary battery and EDLC (electric double layer capacitor). For example, most of the metal oxides and the electrolytes utilized for the metal oxide electrochemical psedocapacitor have been utilized as a cathode material for the lithium secondary battery. However, the metal oxide electrochemical psedocapacitor shows different electrochemical characteristics with those of the lithium secondary battery. For example, they have different cyclic voltammograms. In the cyclic voltammogram, the battery shows a large peak, however, the capacitor including the psedocapacitor shows a quadrilateral shape. In addition, in a charging/discharging behavior, the battery shows a plateau portion, however, the capacitor shows a decreasing straight line of a voltage along with time.

When compared with the EDLC, the psedocapacitor shows the same electrochemical behavior of a common capacitor. However, EDLC employs an activated carbon as an electrode, while the metal oxide electrochemical psedocapacitor employs a metal oxide as the electrode.

An aqueous electrolyte has been used for the metal oxide electrochemical psedocapacitor. However, the aqueous electrolyte has a limitation of exhibiting an electrochemically stable region of 1.0V or less. Accordingly, the energy amount stored by the capacitor is disadvantageous. An energy storage capacitance can be represented by the following equation of (1).

$$E = \tfrac{1}{2} CV^2 \quad (1)$$

In the equation (1), E represents the possible amount of the electric energy, C represents a capacitance and V represents an operating voltage of the capacitor.

According to the equation (1), the possible amount of the electric energy which can be stored in the capacitor is proportional to the square times of the voltage of the capacitor. When the aqueous electrolyte is used for the capacitor, the maximum voltage is 1.0V. Therefore, $E = \tfrac{1}{2}C$. However, when an organic electrolyte is used for the capacitor, the operational voltage becomes 2.3V or more. Therefore, $E = \tfrac{1}{2} C \times 2.32^2$ and $E = \tfrac{1}{2} C \times 5.3$. This means that the amount of the electric energy can be increased by 5.3 times or more according to the electrolyte. The EDLC having the same objective with that of the metal oxide electrochemical psedocapacitor utilizes both the aqueous and organic electrolyte.

However, the metal oxide electrochemical psedocapacitor utilizes only the aqueous electrolyte because this system stores the electric energy in a different manner with that of the EDLC. The EDLC utilizes a physical separation phenomenon of a charge by an electrical double layer formed at an interface of an electrode and the electrolyte. Accordingly, the velocity of charging and discharging is very fast and receives not much effect by the electric conductivity of the electrolyte. However, the metal oxide psedocapacitor utilizes an electrochemical faradaic reaction at an electrode as an energy storage system and proton included in the electrolyte is regarded as a working ion. Accordingly, the organic electrolyte containing a minute amount of the proton is regarded as not exhibiting a good performance in the psedocapacitor.

As for an electrochemical energy storage system utilizing an organic solution and salt as an electrolyte, various methods has been reported by journals and patents for the lithium secondary battery and EDLC. However, the same methods applied for the lithium secondary battery and the EDLC cannot be applied for the metal oxide electrochemical psedocapacitor which is a different electric energy storage system from them. The following two researches seem have a little concern with a metal oxide electrochemical psedocapacitor utilizing the organic electrolyte.

First, S. Passerini, J. J. Ressler, D. B. Le, B. B. Owens and W. H. Smyrl, "$V_2O_5$ Arogel-conducting substrate composites characterization and use as supercapacitor electrodes", in the proceedings of the symposium on electrochemical capacitors, F. M. Delnick and M. Tomkiewicz, Editors, The Electrochemical Society Proceedings Series PV 95-25, P. 86(1995), can be illustrated. According to this report, PC is used as an organic solvent and $LiClO_4$ is used as a salt for the organic electrolyte. Also, vanadium oxide ($V_2O_5$) aerogel is used as an electrode material. The performance of the electrode disclosed in this report shows a different performance with that of the capacitor. For example, a graph of CV does not show an ideal quadrilateral shape of a capacitor.

Next, Kuo-Chuan Liu and M. A. Anderson, "The effects of electrolytes on nickel oxide-based electrochemical capacitors", in the proceedings of the symposium on electrochemical capacitors II, F. M. Delnick, D. Ingersoll, X. Andriue and K. Naoi, Editors, The electrochemical society proceedings series PV 96-25, P. 97(1996), can be illustrated. In this report, $LiClO_4$-PC system is used as for the organic electrolyte as in the previous report and nickel oxide (NiO) is used as for the electrode material.

SUMMARY OF THE INVENTION

Accordingly, it is an object in the present invention to provide a metal oxide electrochemical psedocapacitor which can employ an aluminum current collector and has a wide and stable electrochemical region and an increased amount of electric energy by using an organic electrolyte instead of an aqueous electrolyte which has been used for the conventional metal oxide electrochemical psedocapacitor having a narrow and stable electrochemical region.

Another object of the present invention is to provide an electric energy storage system having an improved electric conductivity by employing an organic electrolyte including both a lithium salt and an ammonium salt.

To accomplish the object, there is provided in the present invention a metal oxide electrochemical psedocapacitor comprising a plurality of electrodes, an organic electrolyte including a solvent and a solute and a separator inserted between the electrodes for preventing a contact between the electrodes.

The preferred solvent is PC (propylene carbonate) and AcN (acetonitrile) and a preferred solute is a lithium salt and an ammonium salt. A preferred mixing ratio of the lithium salt and the ammonium salt is in a range of 4:6–6:4 in a molar ratio.

As for the lithium salt, $LiBF_4$ (lithium tetrafluoroborate), $LiClO_4$ (lithium perchlorate), $LiPF_6$ (lithium hexafluorophosphate), etc. can be advantageously utilized and as for the ammonium salt, $Et_4NBF_4$ (tetraethylammonium tetrafluoroborate), $Et_4NPF_6$ (tetraethylammonium hexafluorophophate), $Et_4NClO_4$ (tetraethylammonium perchlorate), $MeEt_3NBF_4$ (triethylmethylammonium tetrafluoroborate), etc. can be advantageously utilized.

The other object of the present invention can be accomplished by an electric energy storage system comprising a plurality of electrodes, an organic electrolyte including an organic solvent, a lithium salt and an ammonium salt and a separator inserted between the electrodes for preventing a contact between the electrodes.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENT

The present invention will be explained in more detail below.

The research and development on the conventional metal oxide electrochemical psedocapacitor has been limited to a system employing an aqueous solution as an electrolyte. This limitation is based on a theory of a reaction mechanism of storing the electric energy that a proton should be included as a working ion. According to this theory, a reaction of the metal oxide proceed in an electrochemical psedocapacitor is thought to be generated from a combination or separation of the proton with or from the metal oxide as illustrated in the following equation (2).

$$M^{z+}O_x + yH^+ = M^{(z-y)+}O_xH_y \qquad (2)$$

According to this prediction, the reaction of the psedocapacitor is possible in an aqueous electrolyte in which a plenty of proton is included, however, the reaction of the psedocapacitor is principally impossible in an organic electrolyte in which almost no proton is included.

However, the metal oxide can generate an electrochemical reaction by utilizing other working ion which is not proton in an organic electrolyte in a lithium secondary battery. From this point, the possibility of an application of the organic electrolyte in a metal oxide electrochemical psedocapacitor was considered by the present inventors. And other working ions other than proton were observed for the metal oxide electrochemical psedocapacitor. Through repeated experiments, it was verified that a sufficient capacitor performance can be obtained by utilizing an organic electrolyte.

In the present invention, two or more salts are added as the solute along with the organic solvent for the preparation of the organic electrolyte.

In a lithium secondary battery, a salt including lithium is used as the solute dissolved in the solvent. In an EDLC, an ammonium salt such as TEATFB is used as the solute dissolved in the solvent. Meantime, in the present invention, the organic electrolyte includes both of the lithium salt and the ammonium salt for the metal oxide electrochemical psedocapacitor. When one salt is used, a psedocapacitor having a good characteristic cannot be manufactured. The lithium ion becomes the working ion in the present invention. However, if only the lithium ion is used as the solute, an electric conductivity becomes low and a psedocapacitor having a sufficiently good performance cannot be manufactured. If the ammonium salt is additionally added as a supporting electrolyte, the electric conductivity increases and a psedocapacitor having a desired performance can be obtained.

According to the pseudocapacitor of the present invention, an operation of an intercalation and de-intercalation of lithium ion is accomplished at a positive electrode and an operation of an arrangement of electric charges at the surface of the activated carbon is accomplished at a negative electrode. However, the two operation mechanisms are not clearly separated at both electrodes. Rather, it is believed that a small amount of participation by the lithium ion at the negative electrode and that by the ammonium ion at the positive electrode are present.

When summing up thus obtained effects through the above-described two kinds of operating mechanisms by using two kinds of salts, further increased energy storing effect can be obtained when compared with an effect obtainable through just using only one of the two salts.

As for the metal oxide electrode applicable for the present invention, nickel oxide (NiO), ruthenium dioxide ($RuO_2$), cobalt oxide ($Co_3O_4$), manganese dioxide ($MnO_2$), and the like can be used. After repeated experiments by the present inventor, manganese dioxide is selected as a preferred component and more preferably, amorphous manganese dioxide can be used.

In the present invention, the conventionally used electrodes for the metal oxide electrochemical psedocapacitor can be utilized. However, the electrolyte is changed from the aqueous electrolyte into an organic electrolyte such as PC (propylene carbonate), AcN (acetonitrile), and the like. Besides PC and AcN, various solvents such as dimethyl carbonate, ethyl methyl carbonate, diethyl carbonate, -butyrolactone, ethyl carbonate, glutaro nitrile, sulfolane, etc. can be used in the present invention. These solvents are decomposable within a wide range of applying voltage and have relatively high boiling points.

Hydrosulfuric acid, kalium hydroxide, and the like were used as the solute for the solvent, water in the aqueous electrolyte. However, appropriate solutes for the organic solvents such as PC, AcN, etc. are used in the present invention. Particularly, the lithium salt includes $LiBF_4$, $LiClO_4$, $LiPF_6$, etc. and the ammonium salt includes $Et_4NBF_4$, $Et_4NPF_6$, $Et_4NClO_4$, $MeEt_3NBF_4$, etc. Into the above-described organic solvent, a mixture of the lithium salt and the ammonium salt are dissolved to obtain an organic solution and this solution is used as the electrolyte. A preferred addition amount of the solute into the solvent is in the range of 0.1–2.0 molar concentration. If the addition amount of the solute is less than 0.1 molar concentration, an operation as a capacitor is difficult and if the addition amount of the solute exceeds 2.0 molar concentration, excessive amount of the solute is hard to be dissolved into the solvent and is precipitated at room temperature and so, further improved effect cannot be obtained. More preferred addition amount of the solute is in the range of 1.5–2.0 molar concentration.

In the present invention, a current collector made from nickel, copper or aluminum can be used. The maximum electrochemically stable region of the electrolyte is 1.0V for the conventional aqueous electrolyte. However, the stable region of the current collector metal is not much of the same with that of the aqueous electrolyte except that the following expensive metals of platinum, tantalum, titanium, and the like. For the organic electrolyte, however, various kinds of metals can be utilized as the current collector within the stable region of the electrolyte. Cheap metals such as nickel, copper, aluminum, and the like can be exemplified. Particularly, aluminum has been widely used as an electrode for the conventional aluminum condenser because it is very cheap and has a high electric conductivity. For the present invention, aluminum can be preferably utilized.

In addition, the metal current collector made from tantalum, titanium, and the like has another defects of having a low ductility. Therefore, a thin foil-type current collector made from the above-described metal is liable to be broken when it is bent and so, cylindrical type capacitor cannot be manufactured. Further, these metals have high densities to increase a weight of the system including the same.

However, these problems can be solved by utilizing the aluminum current collector along with the organic electrolyte and capacitors having various designs can be manufactured according to the present invention. Aluminum has a high electric conductivity and so ESR (equivalent series resistance) of the capacitor can be decreased to improve an output performance. In addition, a cylindrical type capacitor can be manufactured with the organic electrolyte and aluminum, because aluminum has a good ductility.

The method of manufacturing a metal oxide electrochemical psedocapacitor according to the present invention will be described in more detail through preferred embodiments with reference to the attached drawings. The following materials and methods were applied in the embodiments.

Manganese dioxide of crystalline phase or amorphous type was used for the manufacture of an electrode and conducting carbon was used for a conducting material. A slurry was prepared by using PVdF (polyvinylidene fluoride) binder. At this time, a mixing ratio of metal oxide, conducting carbon and the binder was 8:2:0.15 by weight. Thus prepared slurry was coated onto a current collector of an aluminum foil and then was dried in a drier. Organic electrolyte was prepared by dissolving a mixture solute of a lithium salt such as $LiBF_4$, $LiClO_4$, $LiPF_6$ with an ammonium salt such as $Et_4NBF_4$, $Et_4NPF_6$, $Et_4NClO_4$ and $MeEt_3NBF_4$ into an organic solvent such as PC, AcN, etc.

EXAMPLE 1

A slurry was prepared by mixing amorphous manganese dioxide and conducting carbon in a mixing ratio of 8:2 by weight and adding water in which 15% by weight of PVdF binder was dissolved. Thus prepared slurry was coated onto an aluminum foil having a thickness of about 20 mm and was dried at about 120 C in a drier for about 24 hours to manufacture an electrode. $LiBF_4$ and $Et_4NBF_4$ in a molar mixing ratio of 9:1 were dissolved in PC solvent to prepare an electrolyte. At this time, the total amount of the lithium salt and the ammonium salt was selected so that the concentration of the electrolyte was 1.5M with respect to the solvent PC.

Figure 1:
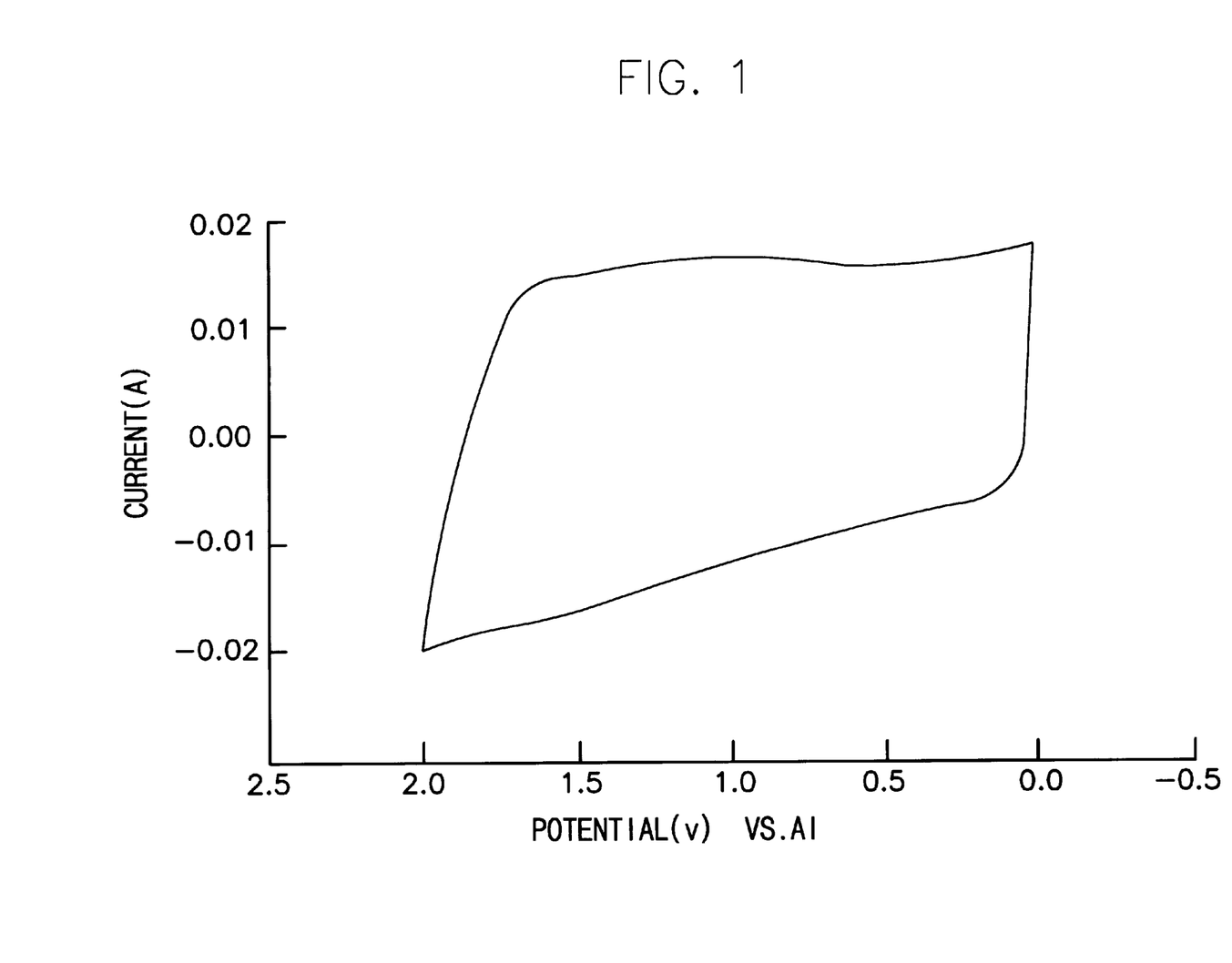
FIG. 1 is a graph obtained by designating CV result for a half-cell manufactured by Example 1 of the present invention.

FIG. 1 is a graph obtained by designating CV result for a half-cell manufactured by the above-described method. This result is obtained for a half-cell with an aluminum electrode to estimate thus manufactured electrode. As known from FIG. 1, an ideal quadrilateral behavior of a capacitor can be illustrated.

EXAMPLES 2–5

Electrodes were manufactured by implementing the same method described in Example 1 except that the molar mixing ratio of the solute of $LiBF_4$ and $Et_4NBF_4$ was changed to 1:9 (Example 2), 3:7 (Example 3), 5:5 (Example 4) and 7:3 (Example 5). The total amount of the solute of the lithium salt and the ammonium salt was controlled to prepare an electrolyte of 1.5M concentration.

Figure 2:
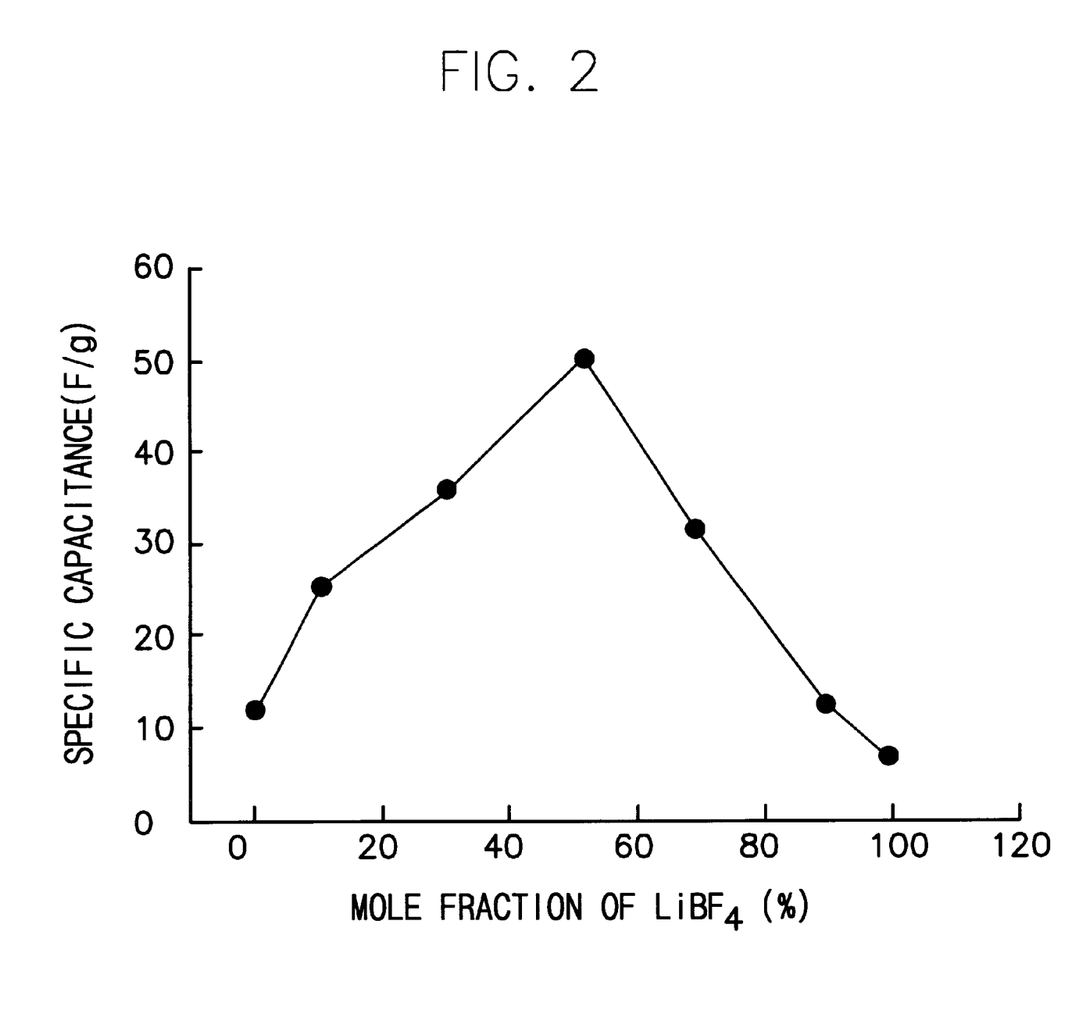
FIG. 2 is a graph obtained by designating specific capacitances for half-cells manufactured by Examples 1–5 of the present invention, in which mole fractions of $LiBF_4$ and $Et_4NBF_4$ in the cells are changed.

FIG. 2 is a graph obtained by designating specific capacitances for half-cells manufactured by Examples 1–5, in which mole fractions of $LiBF_4$ and $Et_4NBF_4$ in the cells were changed as described above. As known from FIG. 2, a high specific capacitance is obtained when the molar mixing ratio of $Et_4NBF_4$ was 40–60% and the highest specific capacitance is obtained when 50%.

EXAMPLE 6

Figure 3:
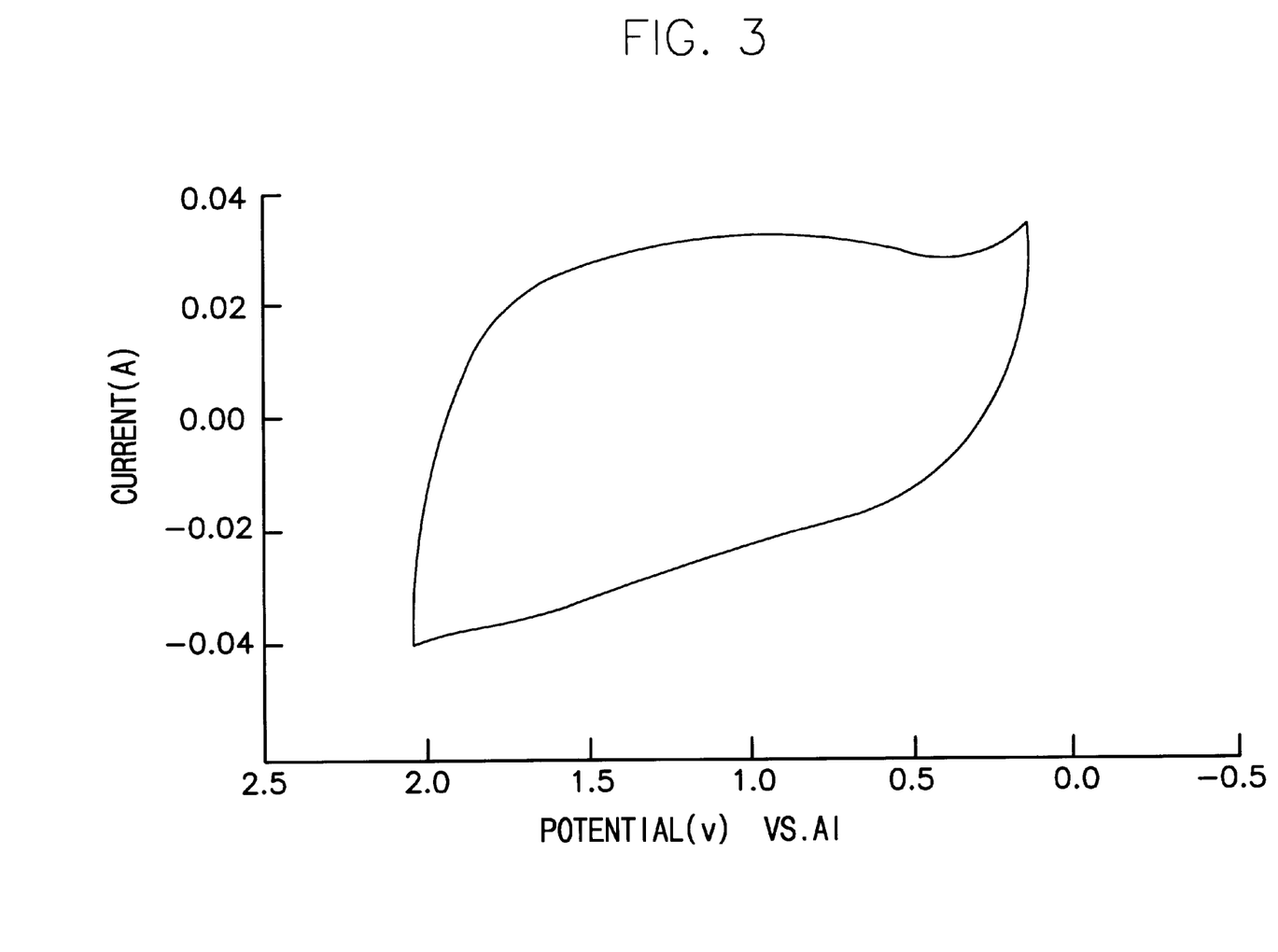
FIG. 3 is a graph obtained by designating CV result for a half-cell manufactured by Example 6 of the present invention.

An electrode was manufactured by implementing the same method described in Example 1 except that AcN was used instead of PC as the solvent. FIG. 3 is a graph obtained by designating CV result for a half-cell manufactured by this embodiment. As known from FIG. 3, an ideal quadrilateral behavior of a capacitor is illustrated.

EXAMPLES 7–10

Electrodes were manufactured by implementing the same method described in Example 6 except that the molar mixing ratio of the solute of $LiBF_4$ and $Et_4NBF_4$ was changed to 1:9 (Example 7), 3:7 (Example 8), 5:5 (Example 9) and 7:3 (Example 10). The total amount of the solute of the lithium salt and the ammonium salt was controlled to prepare an electrolyte of 1.5M concentration.

Figure 4:
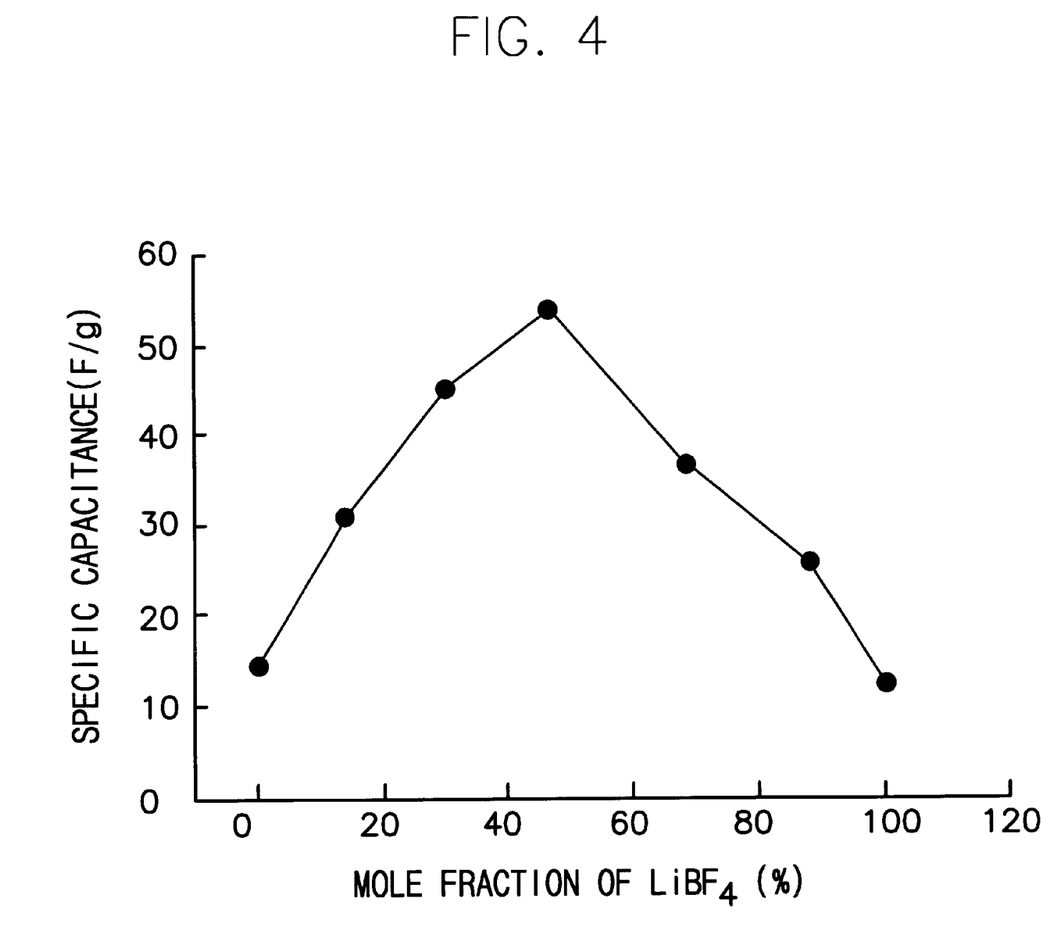
FIG. 4 is a graph obtained by designating specific capacitances for half-cells manufactured by Examples 6–10 of the present invention, in which mole fractions of $LiBF_4$ and $Et_4NBF_4$ in the cells are changed.

FIG. 4 is a graph obtained by designating specific capacitances for half-cells manufactured by Examples 6–10, in which mole fractions of $LiBF_4$ and $Et_4NBF_4$ in the cells were changed as described above. As known from FIG. 4, a high specific capacitance is obtained when the molar mixing ratio of $Et_4NBF_4$ was 40–60% and the highest specific capacitance is obtained when 50%. Further, the higher specific capacitance can be obtained when AcN was used as the solvent instead of PC as in Examples 1–5. It means that AcN is preferred to PC for the solvent.

EXAMPLE 11

An electrode was manufactured by implementing the same method described in Example 9 except that $LiClO_4$ was used instead of $LiBF_4$ as the solute.

EXAMPLE 12

An electrode was manufactured by implementing the same method described in Example 9 except that $LiPF_6$ was used instead of $LiBF_4$ as the solute.

From the result of Examples 9, 11 and 12, an effect of the lithium salt was to estimated. The specific capacitance of the amorphous manganese dioxide in the organic electrolyte including different lithium salts was estimated by utilizing measured CV. The result is illustrated in Table 1. It is known from Table 1 that when the counter ion of the lithium ion is $BF_4^-$, that is, when the lithium salt is $LiBF_4$, the maximum specific capacitance is obtained. That is, $LiBF_4$ is the most preferred lithium salt.

TABLE 1

| Example | 9 | 11 | 12 |
|---|---|---|---|
| Lithium salt | $LiBF_4$ | $LiClO_4$ | $LiPF_6$ |
| specific capacitance (F/g) | 48 | 36 | 41 |

EXAMPLE 13

An electrode was manufactured by implementing the same method described in Example 9 except that $Et_4NPF_4$ was used instead of $Et_4NBF_4$ as the solute.

EXAMPLE 14

An electrode was manufactured by implementing the same method described in Example 9 except that $Et_4NClO_4$ was used instead of $Et_4NBF_4$ as the solute.

EXAMPLE 15

An electrode was manufactured by implementing the same method described in Example 9 except that $MeEt_3NBF_4$ was used instead of $Et_4NBF_4$ as the solute.

From the result of Examples 9 and 13–15, an effect of the ammonium salt was estimated while the lithium salt was fixed to $LiBF_4$. The specific capacitance of the amorphous manganese dioxide in the organic electrolyte including different ammonium salts was estimated by utilizing measured CV. The result is illustrated in Table 2. It is known from Table 2 that when the counter ion of the ammonium ion is $BF_4^-$, that is, when the ammonium salt is $Et_4NBF_4$, the maximum specific capacitance is obtained as for the case of the lithium salt. That is, $Et_4NBF_4$ is the most preferred lithium salt. With the same counter ion $BF_4^-$, $Et_4N^+$ ion illustrate higher specific capacitance than $MeEt_4N^+$ ion.

TABLE 2

| Example | 9 | 13 | 14 | 15 |
|---|---|---|---|---|
| ammonium salt | $Et_4NBF_4$ | $Et_4NPF_4$ | $Et_4NClO_4$ | $MeEt_3NBF_4$ |
| specific capacitance (F/g) | 48 | 44 | 41 | 45 |

EXAMPLE 16

Figure 5:
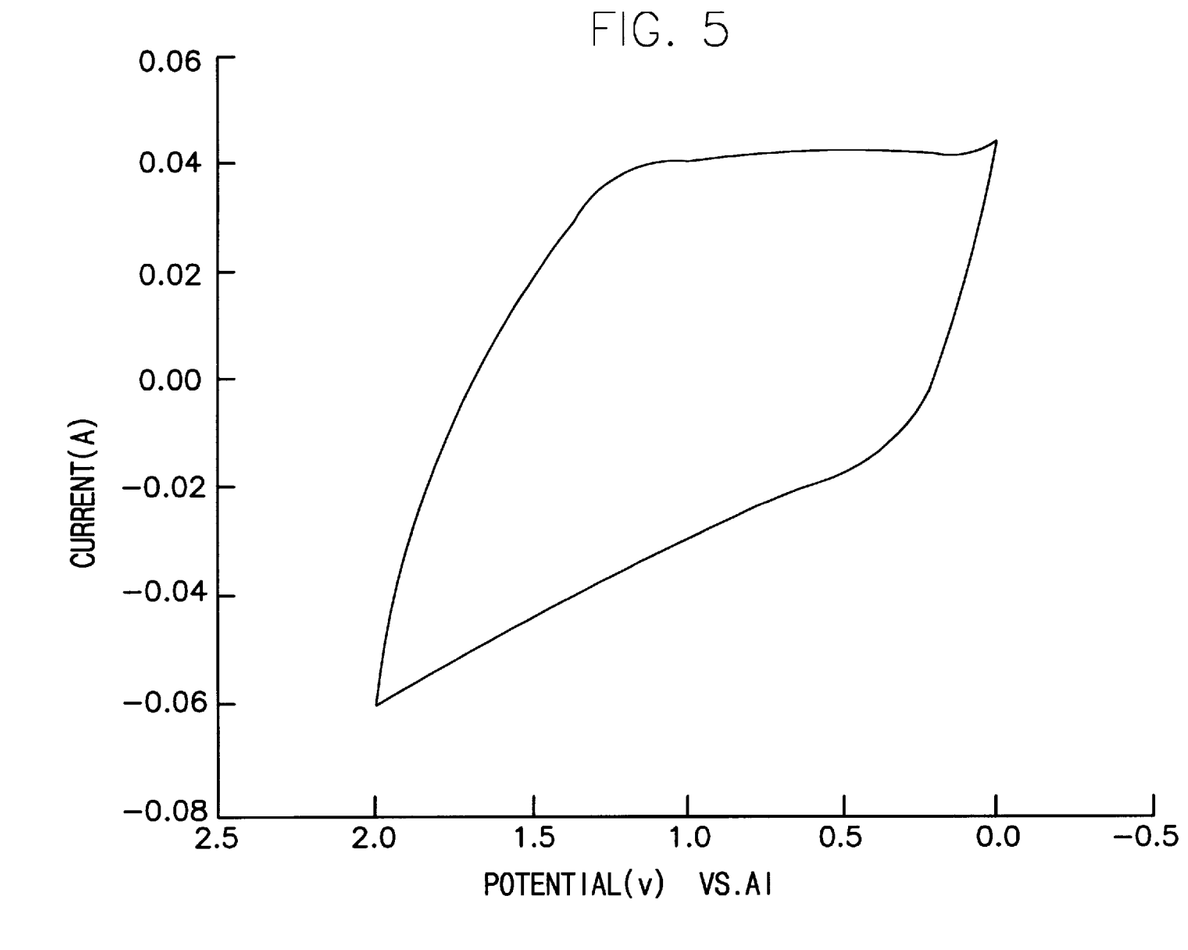
FIG. 5 is a graph obtained by designating CV result for a cylindrical metal oxide electrochemical psedocapacitor manufactured by Example 16 of the present invention.

An electrode was manufactured by implementing the same method described in Example 4 except that manganese dioxide having an alpha phase was used instead of amorphous manganese dioxide. FIG. 5 is a graph obtained by designating CV result for a cylindrical metal oxide electrochemical psedocapacitor manufactured by Example 16. As known from FIG. 5, an ideal quadrilateral behavior of a capacitor is illustrated. The specific capacitance was measured and compared under the same condition as illustrated in Table 3. Amorphous manganese dioxide electrode illustrates somewhat higher value.

TABLE 3

| Example | 4 | 16 |
|---|---|---|
| electrode material | amorphous $MnO_2$ | alpha phase $MnO_2$ |
| specific capacitance (F/g) | 48 | 31 |

EXAMPLE 17

A cylindrical cell having a diameter of 1.0 cm and a height of 3.0 cm was manufactured by utilizing the electrode manufactured by the method described in Example 9. In order to prevent a short between the electrodes, a separator made from polypropylene was inserted. The cell was sealed by using a rubber stopper as for the case of the conventional aluminum condenser. The performance of thus manufactured electrochemical capacitor was estimated.

Figure 6:
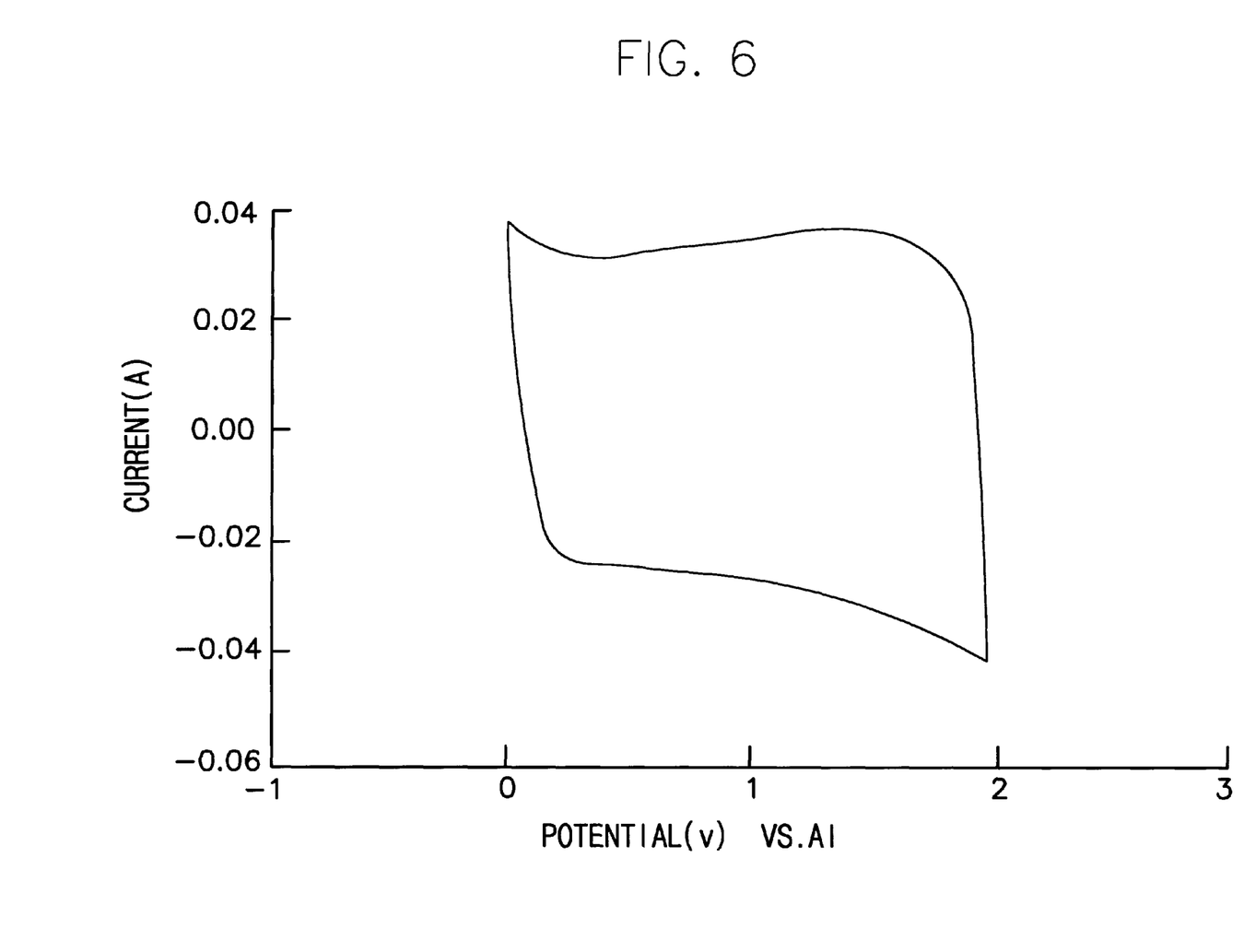
FIG. 6 is a graph obtained by designating CV result for a cylindrical metal oxide electrochemical psedocapacitor manufactured by Example 17 of the present invention.

FIG. 6 is a graph obtained by designating CV result for a cylindrical metal oxide electrochemical psedocapacitor manufactured by Example 17. An ideal capacitor behavior is illustrated and the measured storage amount of an electric energy is about 5 F.

Figure 7:
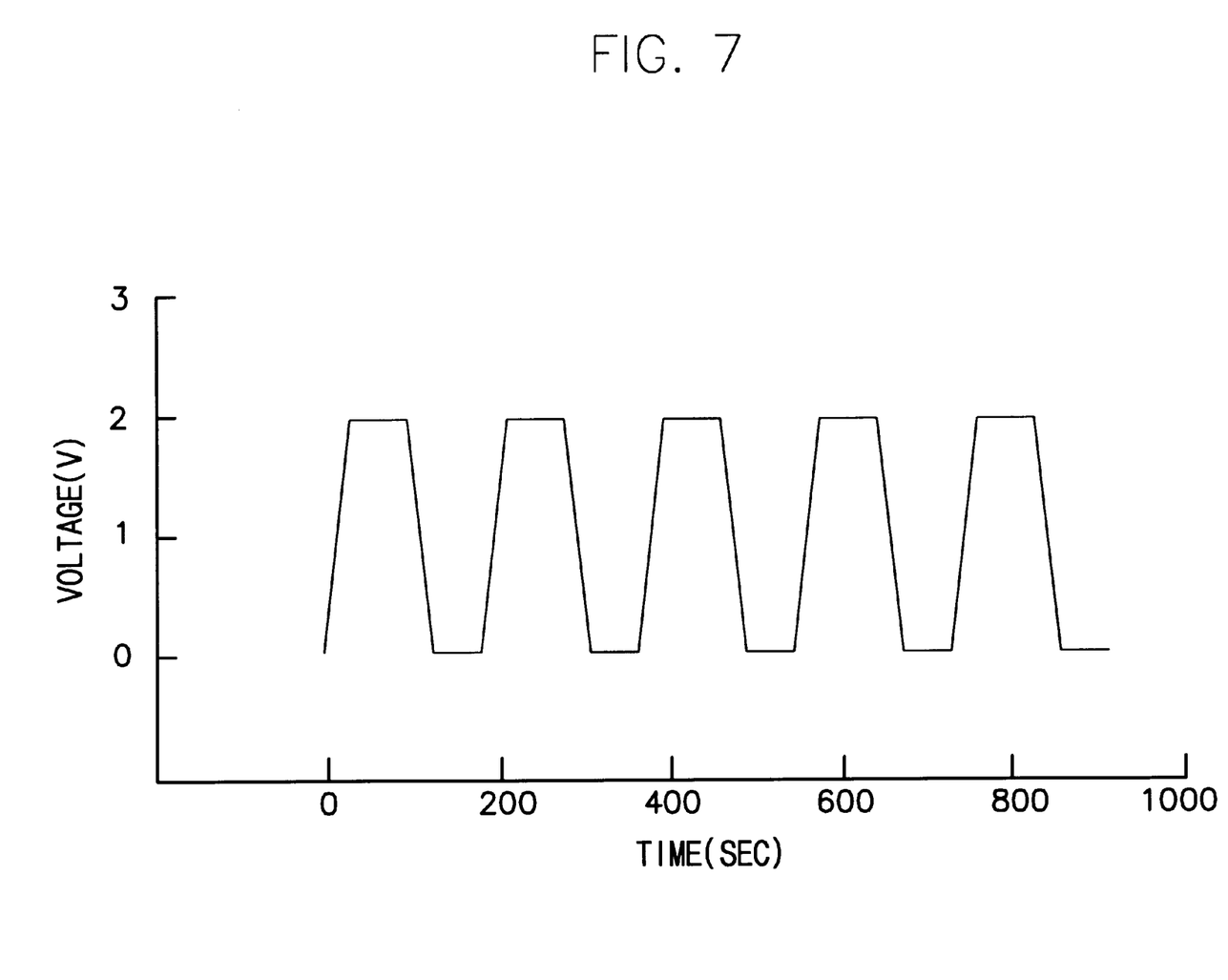
FIG. 7 is a graph obtained by proceeding charging and discharging through applying a fixed current for a cylindrical metal oxide electrochemical psedocapacitor manufactured by Example 17 of the present invention.

FIG. 7 is a graph obtained by proceeding charging and discharging through applying a fixed current for a cylindrical metal oxide electrochemical psedocapacitor manufactured by Example 17. The voltage and time relation is illustrated as a straight line as in a common capacitor.

Figure 8:
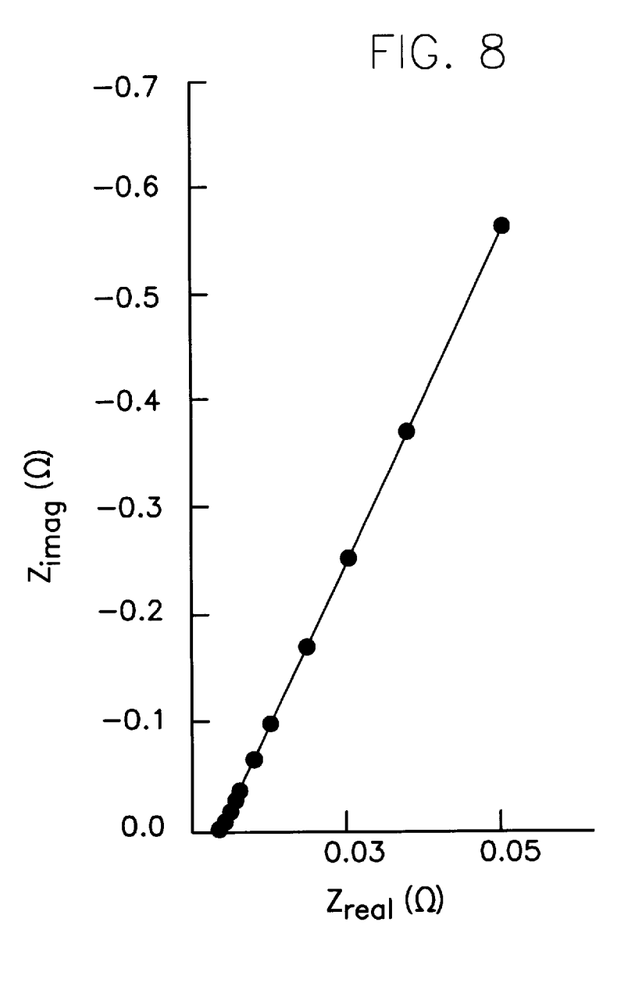
FIG. 8 is a graph obtained by measuring alternating current impedances for a cylindrical metal oxide electrochemical psedocapacitor manufactured by Example 17 of the present invention.

FIG. 8 is a graph obtained by measuring alternating current impedances for a cylindrical metal oxide electrochemical psedocapacitor manufactured by Example 17. In FIG. 8, the portion of the straight line is a characteristic point illustrated in a capacitor and it is confirmed that thus manufactured cell shows an ideal capacitor behavior.

As described above, it is confirmed that the metal oxide electrochemical psedocapacitor according to the present invention illustrates a sufficiently good behavior as a capacitor.

In addition, another electric energy storage system can be manufactured by using an organic electrolyte including an organic solvent, a lithium salt and an ammonium salt by applying the principle of the present invention. It is expected that thus manufactured system has a high electric conductivity.

The following effects can be obtained by replacing the conventionally used aqueous electrolyte with an organic electrolyte for the metal oxide electrochemical psedocapacitor as in the present invention.

First, the storing amount of energy is largely increased. As described above, the storing amount of the electric energy in a capacitor is proportional to the square of voltage by equation (1).

$$E=\frac{1}{2} CV^2 \qquad (1)$$

When the aqueous electrolyte is used for the capacitor, the maximum voltage is 1.0V. Therefore, $E=\frac{1}{2}C$. However, when an organic electrolyte is used for the capacitor, the operational voltage becomes 2.3V or more. Therefore, $E=\frac{1}{2} C \times 2.3^2$ and $E=\frac{1}{2} C \times 5.3$. This means that the amount of the electric energy can be increased by 5.3 times or more according to the electrolyte.

Next, a change of a current collector is possible. The maximum electrochemically stable region of the electrolyte for the conventional aqueous electrolyte is 1.0V. When an organic electrolyte is used, various kinds of metal can be used as the current collector within the stable region of the organic electrolyte. Particularly, cheap metals such as nickel, copper, aluminum, and the like can be used. Among them, aluminum was used for the conventional aluminum condenser and has an advantage of a high electric conductivity. In the present invention, aluminum can be advantageously applied.

In addition, capacitors having various designs can be manufactured. The metal current collector made from tantalum, titanium, and the like which is applicable for the aqueous electrolyte, is expensive and has another defects of having a low ductility. Therefore, a thin foil-type current collector made from the above-described metal is liable to be broken when it is bent and so, a cylindrical type capacitor cannot be manufactured. Further, these metals have high densities to increase a weight of the system including the same.

However, these problems can be solved by utilizing the aluminum current collector along with the organic electrolyte and capacitors having various designs can be manufactured according to the present invention. Aluminum has a high electric conductivity and so ESR of the capacitor can be decreased to improve an output performance. In addition, a cylindrical type capacitor can be manufactured with the organic electrolyte and aluminum because aluminum has a good ductility. Further, since the density of aluminum is low, a decrease of a weight of a capacitor is expected.

While the present invention is described in detail referring to the attached embodiments, various modifications, alternate constructions and equivalents may be employed without departing from the true spirit and scope of the present invention.

What is claimed is:

1. A metal oxide electrochemical psedocapacitor comprising a plurality of electrodes, an organic electrolyte including a solvent and a solute, and a separator inserted between said electrodes for preventing a contract between said electrodes, wherein said solute includes a lithium salt and an ammonium salt, and a mixing ratio of the lithium salt and the ammonium salt is in a range of 4:6–6:4 in a molar ratio.

2. A metal oxide electrochemical psedocapacitor as claimed in claim 1, wherein said solvent is at least one selected from the group consisting of PC (propylene carbonate) and AcN (acetonitrile).

3. A metal oxide electrochemical pseudocapacitor as claimed in claim 1, wherein said lithium salt is at least one selected from the group consisting of $LiBF_4$ (lithium tetrafluoroborate), $LiClO_4$ (lithium perchlorate), $LiPF_6$ (lithium hexafluorophosphate).

4. A metal oxide electrochemical pseudocapacitor as claimed in claim 1, wherein said ammonium salt is at least one selected from the group consisting of $Et_4NBF_4$ (tetraethylammonium tetrafluoroborate), $Et_4NPF_6$ (tetraethylammonium hexafluorophosphate), $Et_4NClO_4$ (tetraethylammonium perchlorate) and $MeEt_3NBF_4$ (triethylmethylammonium tetrafluoroborate).

5. A metal oxide electrochemical psedocapacitor as claimed in claim 1, wherein said organic electrolyte includes about 0.1–2.0 molar concentration of said solute based on said solvent.

6. A metal oxide electrochemical psedocapacitor as claimed in claim 1, wherein said electrode is manufactured from manganese dioxide.

7. A metal oxide electrochemical psedocapacitor as claimed in claim 6, wherein said manganese dioxide is amorphous manganese dioxide.

8. A metal oxide electrochemical psedocapacitor as claimed in claim 1, further comprising a current collector manufactured from nickel, copper or aluminum.

9. A metal oxide electrochemical psedocapacitor as claimed in claim 8, wherein said current collector has a cylindrical shape and is made from aluminum.

10. An electric energy storage system comprising a plurality of electrodes, an organic electrolyte including an organic solvent, a lithium salt and an ammonium salt, and a separator inserted between said electrodes for preventing a contact between said electrodes, wherein a mixing ratio of said lithium salt and said ammonium salt is in a range of about 4:6–6:4 in a molar ratio.

11. An electric energy storage system as claimed in claim 10, wherein said solvent is at least one selected from the group consisting of PC (propylene carbonate) and AcN (acetonitrile).

12. An electric energy storage system as claimed in claim 10, wherein said lithium salt is at least one selected from the group consisting of $LiBF_4$ (lithium tetrafluoroborate), $LiClO_4$ (lithium perchlorate) and $LiPF_6$ (lithium hexafluorophosphate).

13. An electric energy storage system as claimed in claim 10, wherein said ammonium salt is at least one selected from the group consisting of $Et_4NBF_4$ (tetraethylammonium tetrafluoroborate), $Et_4NPF_6$ (tetraethylammonium hexafluorophosphate), $Et_4NClO_4$ (tetraethylammonium perchlorate) and $MeEt_3NBF_4$ (triethylmethylammonium tetrafluoroborate).

* * * * *